United States Patent
Yamazaki et al.

(10) Patent No.: US 8,208,092 B2
(45) Date of Patent: Jun. 26, 2012

(54) LIQUID CRYSTAL DISPLAY DEVICE

(75) Inventors: Sachiko Yamazaki, Mobara (JP);
Ryutaro Oke, Chiba (JP); Ikuko Imajo, Mobara (JP); Masashi Baba, Chiba (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 175 days.

(21) Appl. No.: 12/709,041

(22) Filed: Feb. 19, 2010

(65) Prior Publication Data

US 2010/0208171 A1    Aug. 19, 2010

(30) Foreign Application Priority Data

Feb. 19, 2009  (JP) .................. 2009-036270

(51) Int. Cl.
*G02F 1/1335* (2006.01)
(52) U.S. Cl. .......................... 349/67; 349/64
(58) Field of Classification Search ............. 349/61–71
See application file for complete search history.

(56) References Cited

U.S. PATENT DOCUMENTS

| 5,032,960 | A  | * | 7/1991  | Katoh .................. 362/240 |
| 7,862,221 | B2 |   | 1/2011  | Park et al. |
| 7,869,675 | B2 | * | 1/2011  | Urano .................. 349/61 |
| 2005/0281050 | A1 | * | 12/2005 | Chou .................. 362/612 |
| 2007/0070625 | A1 |   | 3/2007  | Bang |
| 2010/0201910 | A1 | * | 8/2010  | Iiyama et al. .......... 349/61 |

FOREIGN PATENT DOCUMENTS

| CN | 1851500    | 10/2006 |
| JP | 2005-352427 | 12/2005 |
| JP | 2007-180005 | 7/2007 |

* cited by examiner

*Primary Examiner* — Dung T. Nguyen
(74) *Attorney, Agent, or Firm* — Antonelli, Terry, Stout & Kraus, LLP.

(57) ABSTRACT

A liquid crystal display device includes a liquid crystal display panel and a backlight. The backlight includes: a light emitting diode substrate on which light emitting diodes are mounted; a reflection sheet that is provided on the light emitting diode substrate and has holes formed therein, each of the light emitting diodes being provided inside each of the holes; and lenses provided on the light emitting diodes, for diffusing light from the light emitting diodes. Each of the lenses is larger than the each of the holes, and entirely covers the each of the holes and also covers a part of the reflection sheet including an entire periphery of the each of the holes.

2 Claims, 4 Drawing Sheets

LIQUID CRYSTAL DISPLAY DEVICE

CROSS-REFERENCE TO RELATED APPLICATION

The present application claims priority from Japanese application JP2009-36270 filed on Feb. 19, 2009, the content of which is hereby incorporated by reference into this application.

BACKGROUND OF THE INVENTION

1. Field of the Invention

The present invention relates to a liquid crystal display device.

2. Description of the Related Art

It has been known to use a light emitting diode as a light source for a backlight of a liquid crystal display device (JP 2005-352427 A and JP 2007-180005 A (related U.S. application: US 2007/0070625)). The light emitting diode is mounted on a substrate. A surface of the substrate has a low light reflectance, and thus is covered by a reflection sheet. Specifically, the light emitting diode is provided inside a hole of the reflection sheet.

The reflection sheet is attached to the substrate after the light emitting diode is mounted, and hence a size of the hole is set to be larger than an outer shape of the light emitting diode. Therefore, the surface of the substrate is exposed inside the hole. In a region of the exposed surface of the substrate, the light reflectance is lowered, which causes light unevenness. Further, luminance of the backlight is lowered according to an area of the region having the low light reflectance.

SUMMARY OF THE INVENTION

The present invention has an object to enhance luminance of a backlight, and therefore employs the following means.

(1) A liquid crystal display device, including:
a liquid crystal display panel; and
a backlight, in which:
the backlight includes:
  a light emitting diode substrate on which light emitting diodes are mounted;
  a reflection sheet that is provided on the light emitting diode substrate and has holes formed therein, each of the light emitting diodes being provided inside each of the holes; and
  lenses provided on the each of the light emitting diodes, for diffusing light from the light emitting diodes; and
each of the lenses is larger than the each of the holes, and entirely covers the each of the holes and also covers a part of the reflection sheet including an entire periphery of the each of the holes. According to the present invention, even if a surface of the light emitting diode substrate is exposed around the each of the light emitting diodes inside the each of the holes, light is reflected by a surface of the each of the lenses because the each of the lenses covers the exposed surface of the light emitting diode substrate. Accordingly, the luminance of the backlight may be enhanced.

(2) In the liquid crystal display device according to item (1), the each of the lenses may be provided so as to be in contact with the reflection sheet.

(3) In the liquid crystal display device according to item (1), the reflection sheet may have at least one slit formed from the each of the holes so as to extend to an outside of a region facing to the each of the lenses so that the reflection sheet may be attached after the each of the lenses is attached to the each of the light emitting diodes.

DETAILED DESCRIPTION OF THE INVENTION

Hereinafter, an embodiment of the present invention is described with reference to the accompanying drawings.

Figure 1:
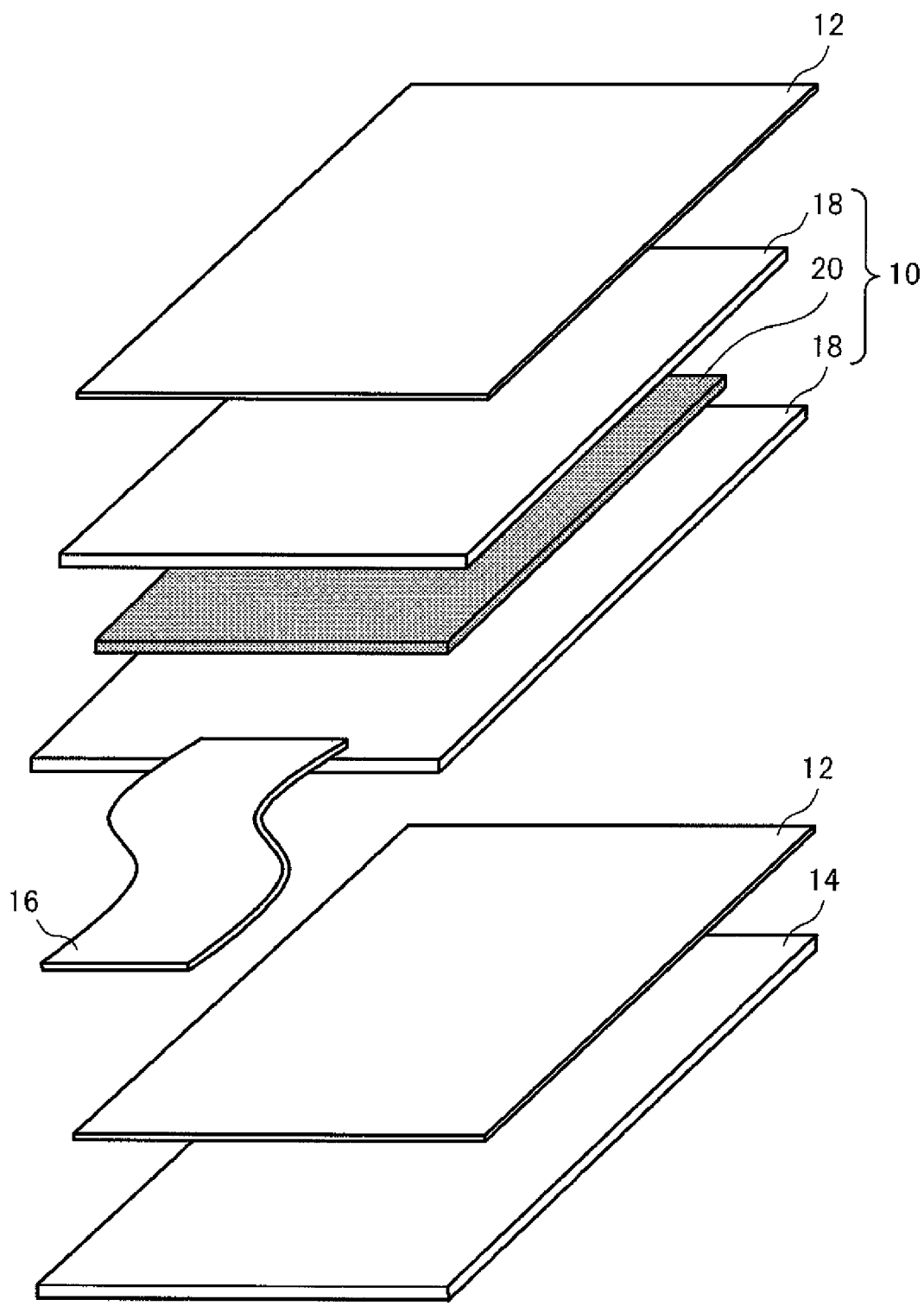
FIG. 1 is an exploded perspective view illustrating a liquid crystal display device according to an embodiment of the present invention.

FIG. 1 is an exploded perspective view illustrating a liquid crystal display device according to the embodiment of the present invention. The liquid crystal display device includes a liquid crystal display panel 10. Polarization plates 12 are provided on both surfaces of the liquid crystal display panel 10. The liquid crystal display device includes a backlight 14. One of the polarization plates 12 is arranged between the liquid crystal display panel 10 and the backlight 14. A flexible printed wiring board 16 is fixed to the liquid crystal display panel 10.

The liquid crystal display panel 10 includes a pair of substrates 18. Liquid crystal 20 is held between the substrates 18. One of the substrates 18 is a thin film transistor (TFT) substrate (or array substrate) including a thin film field-effect transistor, a pixel electrode, wiring, and the like. The other one of the substrates 18 is a color filter substrate.

The liquid crystal display panel 10 may be driven by any mode such as in-plane switching (IPS) mode, twisted nematic (TN) mode, or vertical alignment (VA) mode. An electrode and wiring according to the adopted driving mode are formed.

Figure 2:
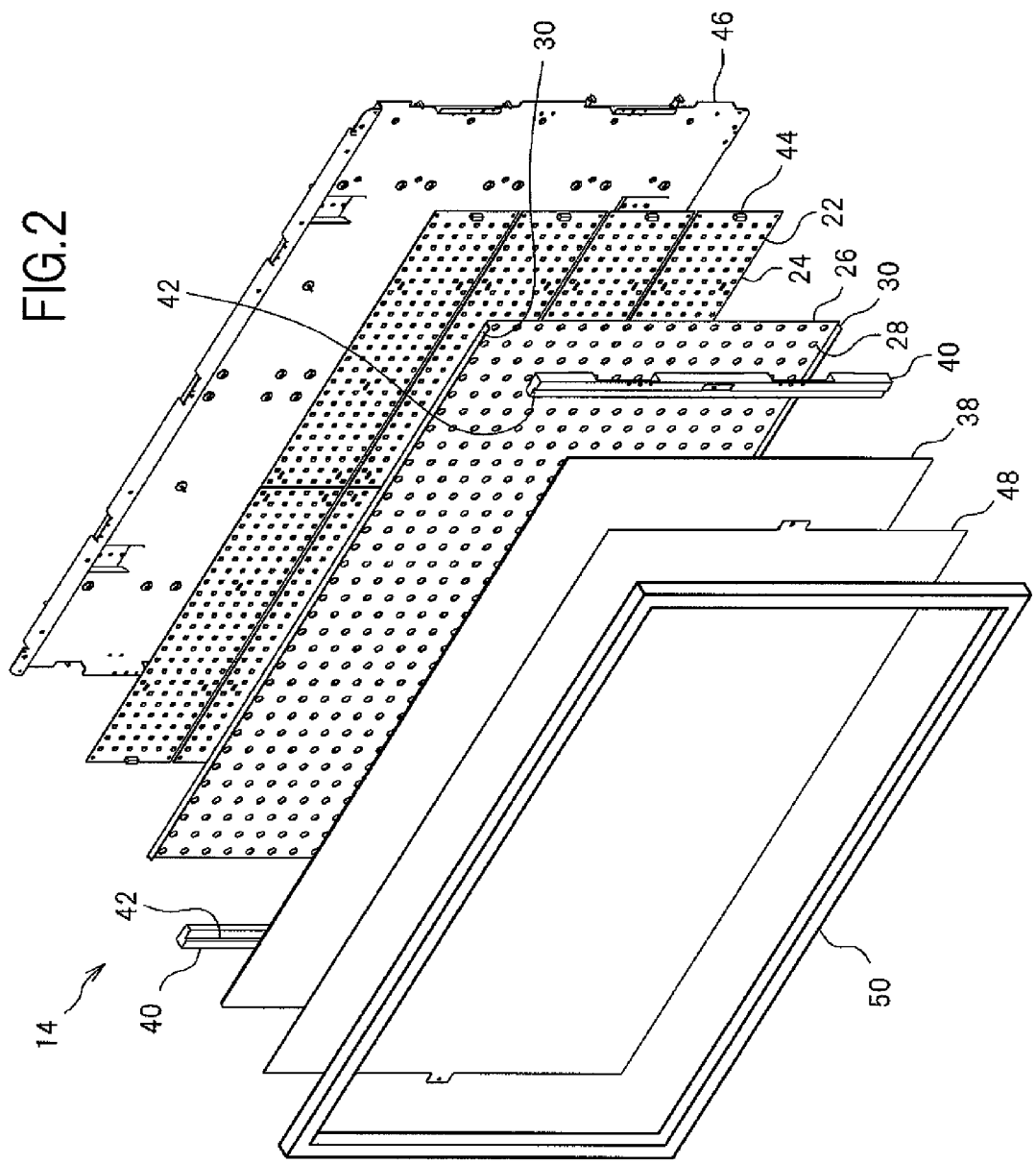
FIG. 2 is an exploded perspective view illustrating a backlight.
Figure 3:
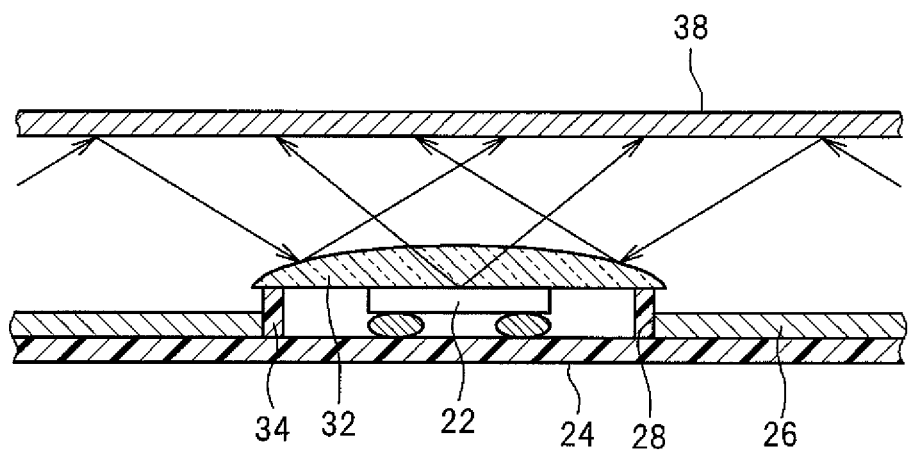
FIG. 3 is a cross sectional view schematically illustrating a part of the backlight.

FIG. 2 is an exploded perspective view illustrating the backlight. FIG. 3 is a cross sectional view schematically illustrating a part of the backlight.

The backlight 14 includes a light emitting diode substrate 24 on which a plurality of light emitting diodes 22 are mounted. Each of the plurality of light emitting diodes 22 serves as a light source. The plurality of light emitting diodes 22 are divided into a plurality of groups, and each group includes two or more light emitting diodes 22 that are connected in series. Therefore, brightness of the light emitting diodes 22 of one group may be adjusted to be different from that of another group. Conversely, a voltage different for each group may be applied according to difference in characteristics of the light emitting diodes 22 of each group, to thereby make uniform the brightness of the light emitting diodes 22 of all the groups.

A reflection sheet 26 is provided on the light emitting diode substrate 24. Holes 28 are formed in the reflection sheet 26, and each of the light emitting diodes 22 is provided inside the hole 28. The reflection sheet 26 has a light reflectance higher than that of a surface of the light emitting diode substrate 24, and reflects light emitted from the light emitting diodes 22. Further, as illustrated in FIG. 2, the reflection sheet 26 is bent at end portions thereof that are not in contact with side supports 40, and the bent end portions each form an erecting portion 30 that erects from the light emitting diode substrate 24. The erecting portion 30 reflects and returns light traveling in a direction parallel to the reflection sheet 26.

A lens 32 for diffusing light from the light emitting diode 22 is provided on the light emitting diode 22. The lens 32 may be supported (fixed) directly onto the light emitting diode 22, or may be supported by a spacer 34. The spacer 34 illustrated in FIG. 3 is provided on the light emitting diode substrate 24 inside the hole 28 of the reflection sheet 26.

The lens 32 (specifically, outer diameter thereof) is larger than the hole 28 (specifically, inner diameter thereof) of the reflection sheet 26. The lens 32 entirely covers the hole 28. The lens 32 also covers a part of the reflection sheet 26 including an entire periphery of the hole 28. In the example illustrated in FIG. 3, the lens 32 is not in contact with the reflection sheet 26. That is, a part of the lens 32 (an end portion of the lens 32) that is opposed to the reflection sheet 26 is located above the reflection sheet 26 with an interval therebetween.

A surface of the lens 32 (a convex surface corresponding to an upper surface thereof in FIG. 3) serves both as a light outgoing surface for light that has been emitted from the light emitting diode 22 provided below the lens 32 and has entered the lens 32 and as a light incident surface for light that has propagated from, for example, an adjacent light emitting diode 22. In this configuration, light that has reached the surface of the lens 32 at an angle exceeding a critical angle is reflected by the surface of the lens 32. Therefore, even when the surface of the light emitting diode substrate 24 is exposed around the light emitting diode 22 inside the hole 28, light does not reach the surface of the light emitting diode substrate 24 (light absorbing surface), and hence luminance of the backlight 14 may be enhanced.

Figure 4:
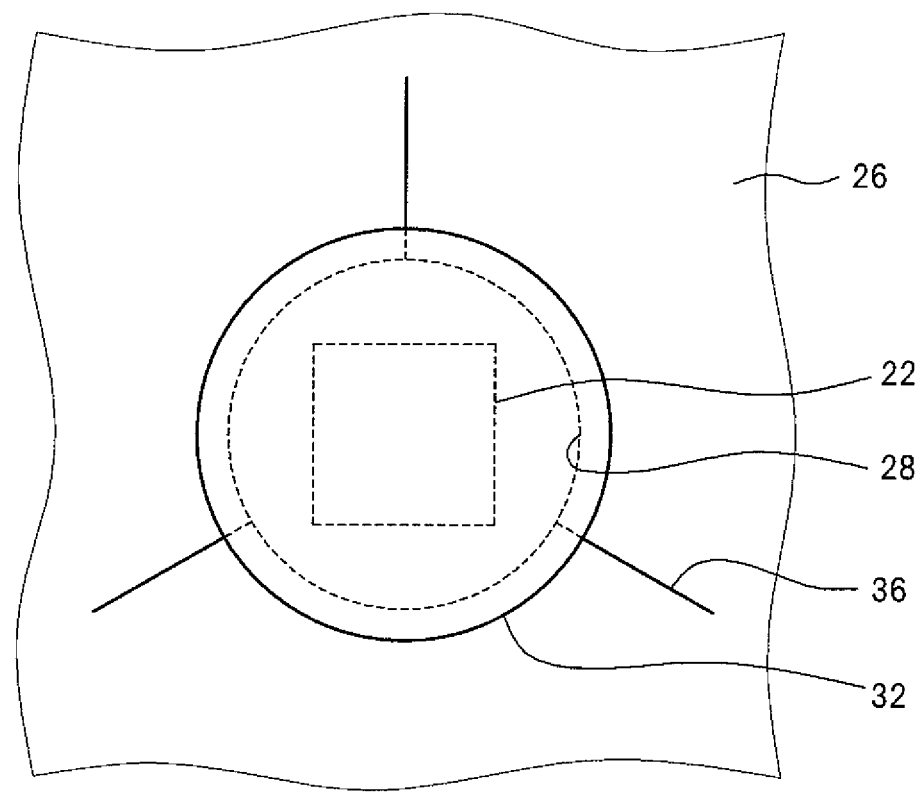
FIG. 4 is a plan view schematically illustrating a part of the backlight.

FIG. 4 is a plan view schematically illustrating a part of the backlight. At least one slit 36 is formed in the reflection sheet 26 from the hole 28 to the outside of a region of the reflection sheet 26 that is opposed to the lens 32. The lens 32 that is larger than an original size of the hole 28 may be inserted through the hole 28 by enlarging the hole 28 with the slit 36. Therefore, the reflection sheet 26 may be attached after the lens 32 is attached to the light emitting diode 22.

A diffusion plate 38 is provided above the light emitting diode substrate 24 with an interval therebetween (see FIG. 3). Light emitted from the light emitting diode 22 is diffused by the diffusion plate 38, to thereby reduce brightness unevenness. Part of the light emitted from the light emitting diode 22 is reflected by the diffusion plate 38 and travels toward the lens 32 or the reflection sheet 26.

As illustrated in FIG. 2, the diffusion plate 38 is supported by the side supports 40 at end portions (specifically, at a pair of opposed end portions) of the light emitting diode substrate 24. The side support 40 is formed by molding a resin, and also referred to as a side mold. A step 42 is formed on an upper surface of the side support 40, and used for positioning (specifically, positioning in a direction along a surface of the diffusion plate 38 and in a direction toward the side support 40) of the diffusion plate 38.

Connectors 44 for electrical connection with external components are mounted on the light emitting diode substrate 24. One connector 44 corresponds to one group of the light emitting diodes 22, and a plurality of the connectors 44 are mounted on the light emitting diode substrate 24. The backlight 14 includes a lower frame 46. The side supports 40 also function as a member for reinforcing the lower frame 46. The lower frame 46 is provided on a surface of the light emitting diode substrate 24 that is opposite to a surface thereof on which the plurality of light emitting diodes 22 are mounted. The backlight 14 further includes an optical sheet 48 provided so as to be overlaid on the diffusion plate 38. The backlight 14 still further includes an upper frame 50, and a region surrounded by the upper frame 50 is a display region. The optical sheet 48, the diffusion plate 38, the side supports 40, the reflection sheet 26, and the light emitting diode substrate 24 are provided between the upper frame 50 and the lower frame 46.

Figure 5:
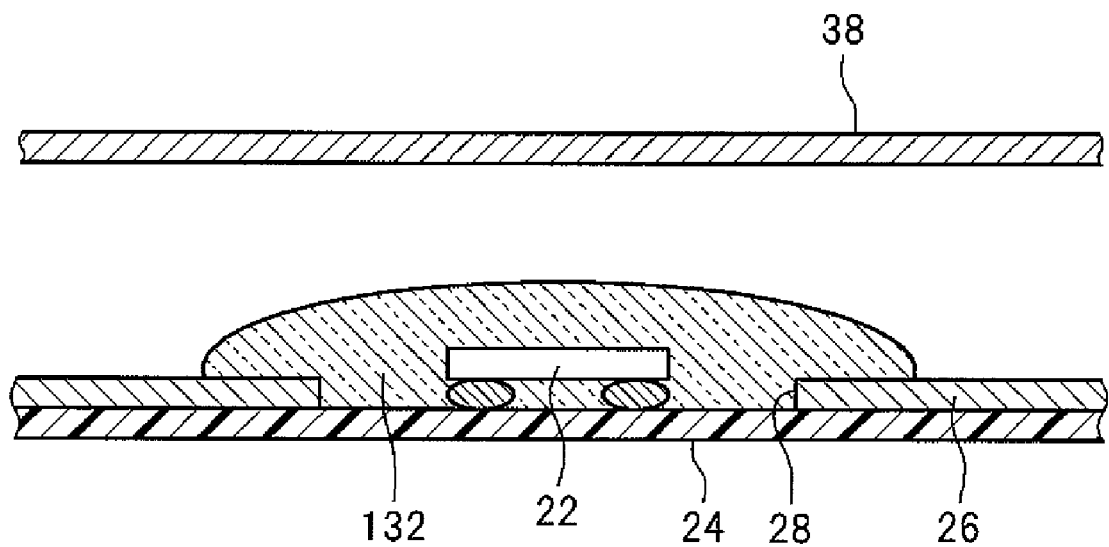
FIG. 5 is a cross sectional view schematically illustrating apart of a backlight according to a modified example of the present invention.

FIG. 5 is a cross sectional view schematically illustrating a part of a backlight according to a modified example of the present invention. In this modified example, a lens 132 is provided so as to be in contact with the reflection sheet 26. Specifically, the end portion of the lens 132 extends directly on the part of the reflection sheet 26 including the entire periphery of the hole 28.

In the example illustrated in FIG. 5, a constituent material (for example, transparent resin) of the lens 132 is provided also between the light emitting diode 22 and the light emitting diode substrate 24. This structure is obtained in the following manner. That is, the light emitting diode 22 is mounted on the light emitting diode substrate 24. Then, a resin precursor in a liquid or paste form is provided by potting or the like so as to cover the light emitting diode 22. A lens surface is formed by surface tension. Then, the resin precursor is cured, to thereby complete the structure. The other details of this modified example are the same as those of the embodiment described above.

The present invention is not limited to the above-mentioned embodiment, and may be variously modified. For example, the structure of the embodiment described above may be replaced by a structure that is substantially the same as that of the embodiment, a structure that provides the same action and effect as those of the embodiment, or a structure that may achieve the same object as that of the embodiment.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
a liquid crystal display panel; and
a backlight, wherein:
the backlight includes:
a light emitting diode substrate on which light emitting diodes are mounted;
a reflection sheet that is provided on the light emitting diode substrate and has holes formed therein, each of the light emitting diodes being provided inside each of the holes;
lenses provided on each of the light emitting diodes, for diffusing light from the light emitting diodes;
each of the lenses is larger than each of the holes, and entirely covers each of the holes and also covers a part of the reflection sheet including an entire periphery of the each of holes; and
the reflection sheet has at least one slit formed from each of the holes so as to extend to an outside of a region facing to each of the lenses so that the reflection sheet may be attached after each of the lenses is attached to each of the light emitting diodes.

2. The liquid crystal display device according to claim 1, wherein the each of the lenses is provided so as to be in contact with the reflection sheet.

* * * * *